(12) United States Patent
Cakulev et al.

(10) Patent No.: US 12,156,269 B2
(45) Date of Patent: Nov. 26, 2024

(54) SYSTEMS AND METHODS FOR ENABLING AN ALTERNATE QUALITY OF SERVICE FOR NON-GUARANTEED BIT RATE FLOWS

(71) Applicant: Verizon Patent and Licensing Inc., Basking Ridge, NJ (US)

(72) Inventors: Violeta Cakulev, Milburn, NJ (US); Lixia Yan, Basking Ridge, NJ (US); Yousef Abdelmalek, New Providence, NJ (US); Sudhakar Reddy Patil, Flower Mound, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 356 days.

(21) Appl. No.: 17/808,828

(22) Filed: Jun. 24, 2022

(65) Prior Publication Data
US 2023/0422326 A1    Dec. 28, 2023

(51) Int. Cl.
*H04W 76/15*    (2018.01)
*H04W 28/02*    (2009.01)
*H04W 80/10*    (2009.01)

(52) U.S. Cl.
CPC ....... *H04W 76/15* (2018.02); *H04W 28/0268* (2013.01); *H04W 80/10* (2013.01)

(58) Field of Classification Search
None
See application file for complete search history.

(56) References Cited

U.S. PATENT DOCUMENTS

2020/0112872 A1* 4/2020 Nimbavikar .......... H04L 47/805
2022/0345932 A1* 10/2022 Zhou ................. H04W 28/0247

\* cited by examiner

*Primary Examiner* — Christine T Duong (57) ABSTRACT

A network device may receive a PDU session create message associated with establishing a PDU session with a user device and via a RAN, and may receive a first 5QI value and a second 5QI value associated with the PDU session. The network device may attempt to establish the PDU session with the first 5QI value and via the RAN, and may receive an indication that the first 5QI value is not supported for establishing the PDU session. The network device may cause the PDU session to be established with the second 5QI value, and via the RAN, based on the indication that the first 5QI value is not supported for establishing the PDU session.

20 Claims, 7 Drawing Sheets

SYSTEMS AND METHODS FOR ENABLING AN ALTERNATE QUALITY OF SERVICE FOR NON-GUARANTEED BIT RATE FLOWS

BACKGROUND

A Third Generation Partnership Project (3GPP)-defined quality of service (QoS) framework may rely on a fifth-generation (5G) QoS identifier (5QI). A 5QI is a scalar value that is used as a reference to 5G QoS characteristics (e.g., access node-specific parameters that control QoS forwarding treatment for traffic from a user device). These node-specific parameters need to be preconfigured in a radio access network (RAN) for each supported 5QI.

DETAILED DESCRIPTION OF EXAMPLE EMBODIMENTS

The following detailed description of example implementations refers to the accompanying drawings. The same reference numbers in different drawings may identify the same or similar elements.

A quantity of 5QI values are standardized for services that are assumed to be frequently used and thus benefit from optimized signaling based on standardized QoS characteristics. While some of the standardized 5QI values are associated with relaxed QoS parameters, other standardized 5QI values are associated with very stringent QoS characteristics (e.g., a low packet delay budget) and require advanced support in the RAN to meet the very stringent QoS characteristics. For a 5QI value to be utilized, all network devices of a RAN need to be configured for the 5QI value. If a session and/or non-guaranteed bit rate (non-GBR) flow establishment is attempted using a 5QI that is not supported in the RAN, the RAN will fail to establish the flow and indicate, to a core network, that the 5QI is not supported. Furthermore, every subsequent reattempt to establish the flow will fail since there is no mechanism to address scenarios when a 5QI is not supported in the RAN. Finally, there are sessions that benefit from the stringent QoS characteristics but may adapt to less stringent QoS characteristics. Such sessions cannot be created using the less stringent QoS characteristics when the 5QI with more stringent QoS characteristics is not supported in the RAN.

Thus, current network configurations consume computing resources (e.g., processing resources, memory resources, communication resources, and/or the like), networking resources, and/or other resources associated with failing to establish sessions for 5QI values that are not supported by a RAN, reattempting and failing to establish the sessions for the 5QI values that are not supported by the RAN, providing a poor user experience for a user of a user device, and/or the like.

Some implementations described herein provide a network device (e.g., a session management function (SMF)) that enables an alternate QoS for non-guaranteed bit rate flows. For example, the SMF may establish a policy control session with a policy control function (PCF), may receive a protocol data unit (PDU) session create message associated with establishing a PDU session with a user device and via a RAN, and may receive a first 5QI value and a second 5QI value associated with the PDU session. The SMF may attempt to establish the PDU session with the first 5QI value and via the RAN, and may receive an indication that the first 5QI value is not supported for establishing the PDU session. The SMF may cause the PDU session to be established with the second 5QI value, and via the RAN, based on the indication that the first 5QI value is not supported for establishing the PDU session. The SMF may provide, to the PCF and via the policy control session, a QoS update for the PDU session.

In this way, the SMF enables an alternate QoS for non-guaranteed bit rate flows. For example, the SMF may utilize two approaches that enable a session and/or non-GBR flow to be created with an alternate 5QI when session and/or non-GBR flow creation is being rejected due to the 5QI not being supported in a RAN. In a first approach, the SMF may reattempt session creation when an indication is received from the RAN that the 5QI is not supported. In a second approach, the SMF may provide the alternate 5QI to the RAN so that the RAN may utilize the alternate 5QI when a preferred 5QI is not supported. Thus, the SMF may conserve computing resources, networking resources, and/or other resources that would have otherwise been consumed by failing to establish sessions for 5QI values that are not supported by a RAN, reattempting and failing to establish the sessions for the 5QI values that are not supported by the RAN, providing a poor user experience for a user of a user device, and/or the like. The SMF may improve control plane latency when the RAN 110 utilizes the alternate 5QI value, may provide a better user experience for a user of the user device 105, may enable application requirements to be utilized to determine preferred and alternate QoS characteristics, and/or the like.

FIGS. 1A-1D are diagrams of an example 100 associated with enabling an alternate QoS for non-guaranteed bit rate flows. As shown in FIGS. 1A-1D, example 100 includes a user device 105, a RAN 110, and a core network 115 that includes an SMF 120, an access and mobility management function (AMF), and a PCF. Further details of the user device 105, the RAN 110, the core network 115, the SMF 120, the AMF, and the PCF are provided elsewhere herein.

Figure 1A:
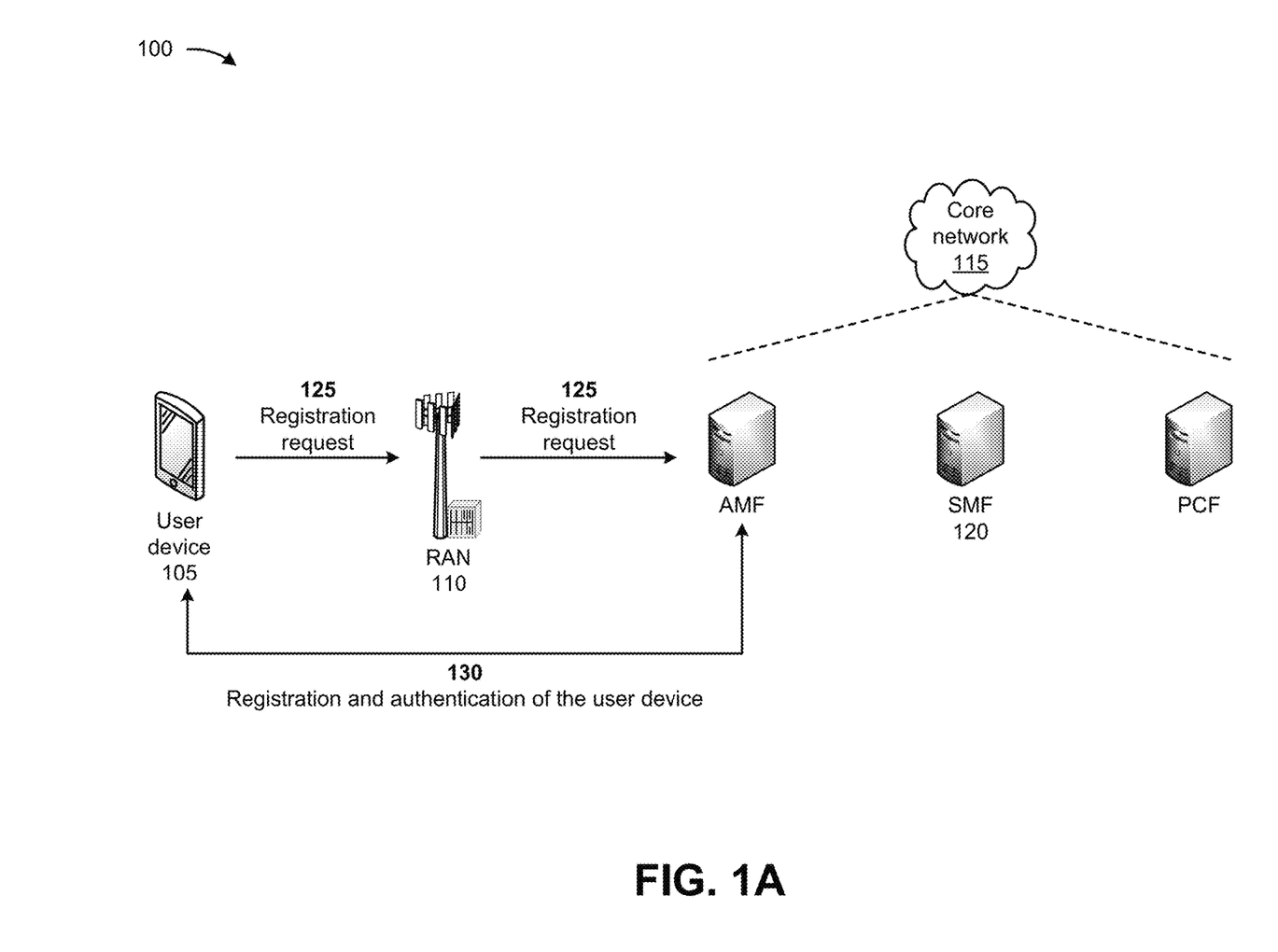
FIGS. 1A-1D are diagrams of an example associated with enabling an alternate QoS for non-guaranteed bit rate flows.

As shown in FIG. 1A, and by reference number 125, the user device 105 may provide a registration request to the RAN 110 and the RAN 110 may provide the registration request to the AMF. For example, the user device 105 may attempt to establish a PDU session (e.g., a non-GBR flow) with the core network 115, via the RAN 110, in order to communicate with another user device 105, an application server, a cloud computing environment, and/or the like. In order to establish the PDU session, the user device 105 may generate the registration request that requests establishment of the PDU session with the RAN 110 and the core network 115. The registration request may also include credentials of a user of the user device 105, an identifier of the user device 105, an indication that the PDU session is a non-GBR flow, and/or the like. The user device 105 may provide the registration request to the RAN 110, and the RAN 110 may forward the registration request to the AMF. The AMF may receive the registration request from the RAN 110.

As further shown in FIG. 1A, and by reference number 130, the AMF may perform registration and authentication of the user device 105, via the RAN 110. For example, the AMF may be responsible for handling connection and mobility management tasks, such as registering and authenticating the user device 105 for establishment of the PDU session. The AMF, alone or in combination with other network elements of the core network 115, may review the information included in the registration request, and may deny registration and/or authentication of the user device 105, for establishment of the PDU session, based on the information included in the registration request. Alternatively, the AMF may allow registration and/or authentication of the user device 105, for establishment of the PDU session, based on the information included in the registration request.

Figure 1B:
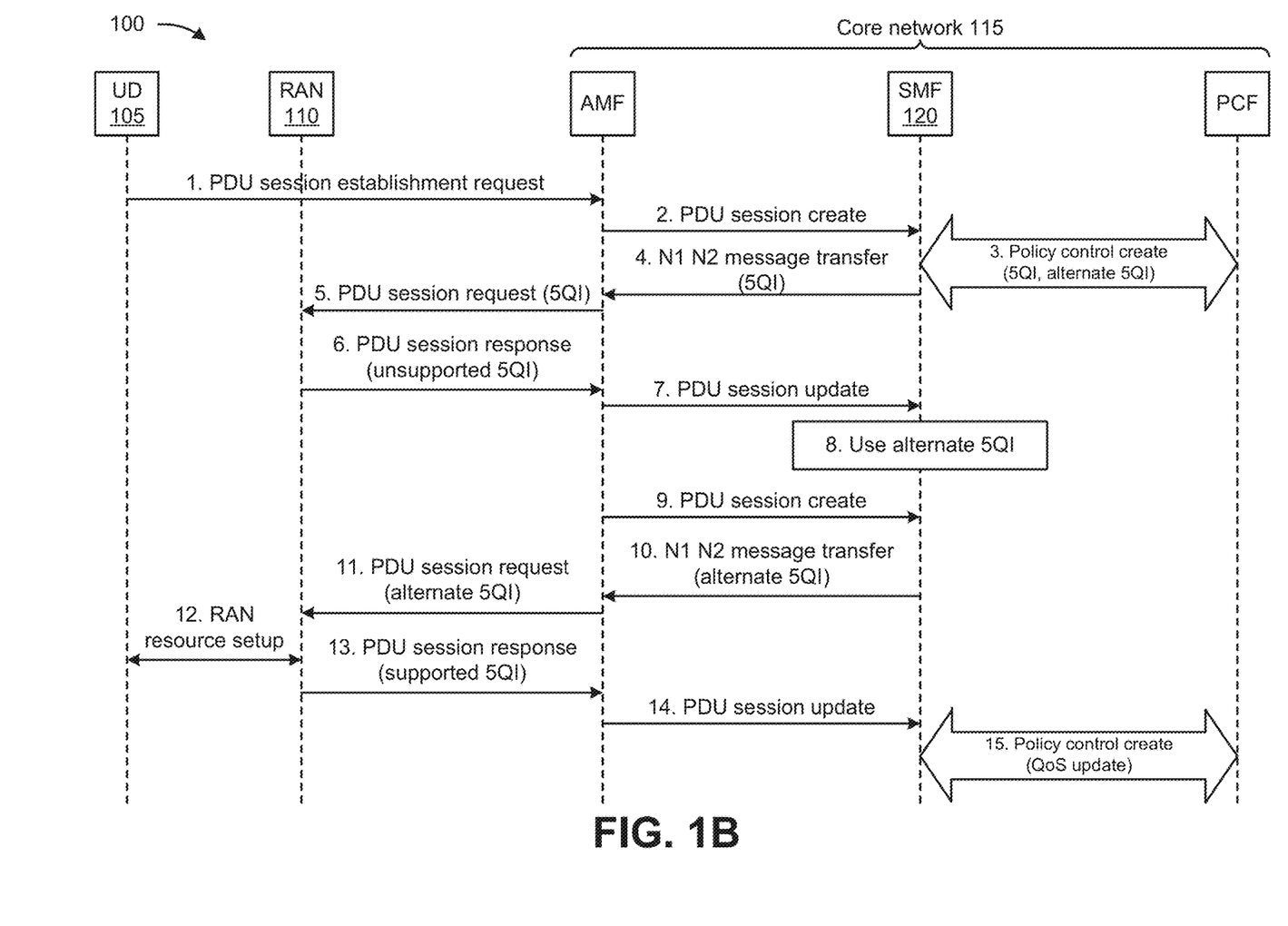

FIG. 1B is a call flow diagram depicting steps associated with a first approach for enabling a PDU session and/or non-GBR flow to be created with an alternate 5QI when PDU session and/or non-GBR flow creation is being rejected due to the 5QI not being supported in the RAN 110. As shown at step 1 of FIG. 1B, once the user device 105 is registered and authenticated for establishment of the PDU session, the user device 105 may provide a PDU session establishment request to the AMF. The PDU session establishment request may include a request to establish the PDU session with the RAN 110 and the core network 115. As shown in step 2, the AMF and the SMF 120 may communicate to create the PDU session for the user device 105. For example, the AMF may provide a request to create the PDU session, and PDU session management requirements, to the SMF 120, and the SMF 120 may receive the request and the PDU session management requirements. As shown at step 3, the SMF 120 may establish a policy control session with the PCF, and may request policy control information from the PCF, via the policy control session. Based on operator policies, a subscriber profile associated with the user of the user device 105, and other inputs, the PCF may determine that a preferred 5QI value (e.g., identified as 5QI in FIG. 1B) with stringent QoS characteristics is to be used for the PDU session, but that an alternate 5QI value (e.g., with less stringent QoS characteristics than the preferred 5QI value) may be used as well. The PCF may provide the preferred 5QI value and the alternate 5QI value to the SMF 120, and the SMF 120 may receive the preferred 5QI value and the alternate 5QI value.

As shown at step 4 of FIG. 1B, the SMF 120 may transfer a message to the AMF. The message may include the preferred 5QI value and/or other policy control information for the PDU session. As shown at step 5, the AMF may generate a PDU session request that includes the preferred 5QI value, and may provide the PDU session request, with the preferred 5QI value, to the RAN 110. The RAN 110 may receive the PDU session request, and may determine whether the PDU session can be created based on the preferred 5QI value. In some implementations, the RAN 110 may determine that the PDU session can be created based on the preferred 5QI value. Alternatively, the RAN 110 may determine that the PDU session cannot be created based on the preferred 5QI value. In such situations, the RAN 110 may generate a PDU session response indicating that the PDU session cannot be created since the preferred 5QI value is not supported by the RAN 110. As shown at step 6, the RAN 110 may provide the PDU session response (e.g., with the indication that the preferred 5QI value is not supported by the RAN 110) to the AMF.

Based on receiving the PDU session response, the AMF may generate a PDU session update message that includes the indication that the preferred 5QI value is not supported by the RAN 110. As shown at step 7 of FIG. 1B, the AMF may provide the PDU session update message to the SMF 120, and the SMF 120 may receive the PDU session update message. As shown at step 8, based on the indication that the preferred 5QI value is not supported by the RAN 110 (e.g., included in the PDU session update message), the SMF 120 may determine that the PDU session is to be created based on the alternate 5QI value. As shown at step 9, the AMF may provide another request to create the PDU session, and the PDU session management requirements, to the SMF 120, and the SMF 120 may receive the other request and the PDU session management requirements.

As shown at step 10 of FIG. 1B, the SMF 120 may transfer another message to the AMF. The other message may include the alternate 5QI value and/or other policy control information for the PDU session. As shown at step 11, the AMF may generate another PDU session request that includes the alternate 5QI value, and may provide the other PDU session request, with the alternate 5QI value, to the RAN 110. The RAN 110 may receive the other PDU session request, and may determine whether the PDU session can be created based on the alternate 5QI value. The RAN 110 may determine that the PDU session can be created based on the alternate 5QI value. In such situations, the RAN 110 may set up resources of the RAN 110 for the user device 105 to utilize during the PDU session. As shown at step 12, the RAN 110 may allocate the resources of the RAN 110 to the user device 105. The RAN 110 also may generate another PDU session response indicating that the PDU session can be created since the alternate 5QI value is supported by the RAN 110. As shown at step 13, the RAN 110 may provide the other PDU session response (e.g., with the indication that the alternate 5QI value is supported by the RAN 110) to the AMF.

Based on receiving the other PDU session response, the AMF may generate another PDU session update message that includes the indication that the alternate 5QI value is supported by the RAN 110. As shown at step 14 of FIG. 1B, the AMF may provide the other PDU session update message to the SMF 120, and the SMF 120 may receive the other PDU session update message. As shown at step 15, based on the indication that the alternate 5QI value is supported by the RAN 110 (e.g., included in the other PDU session update message), the SMF 120 may update the policy control session with the PCF by providing a QoS update (e.g., indicating that the alternate 5QI value is being utilized for the PDU session) to the PCF, via the policy control session.

Figure 1C:
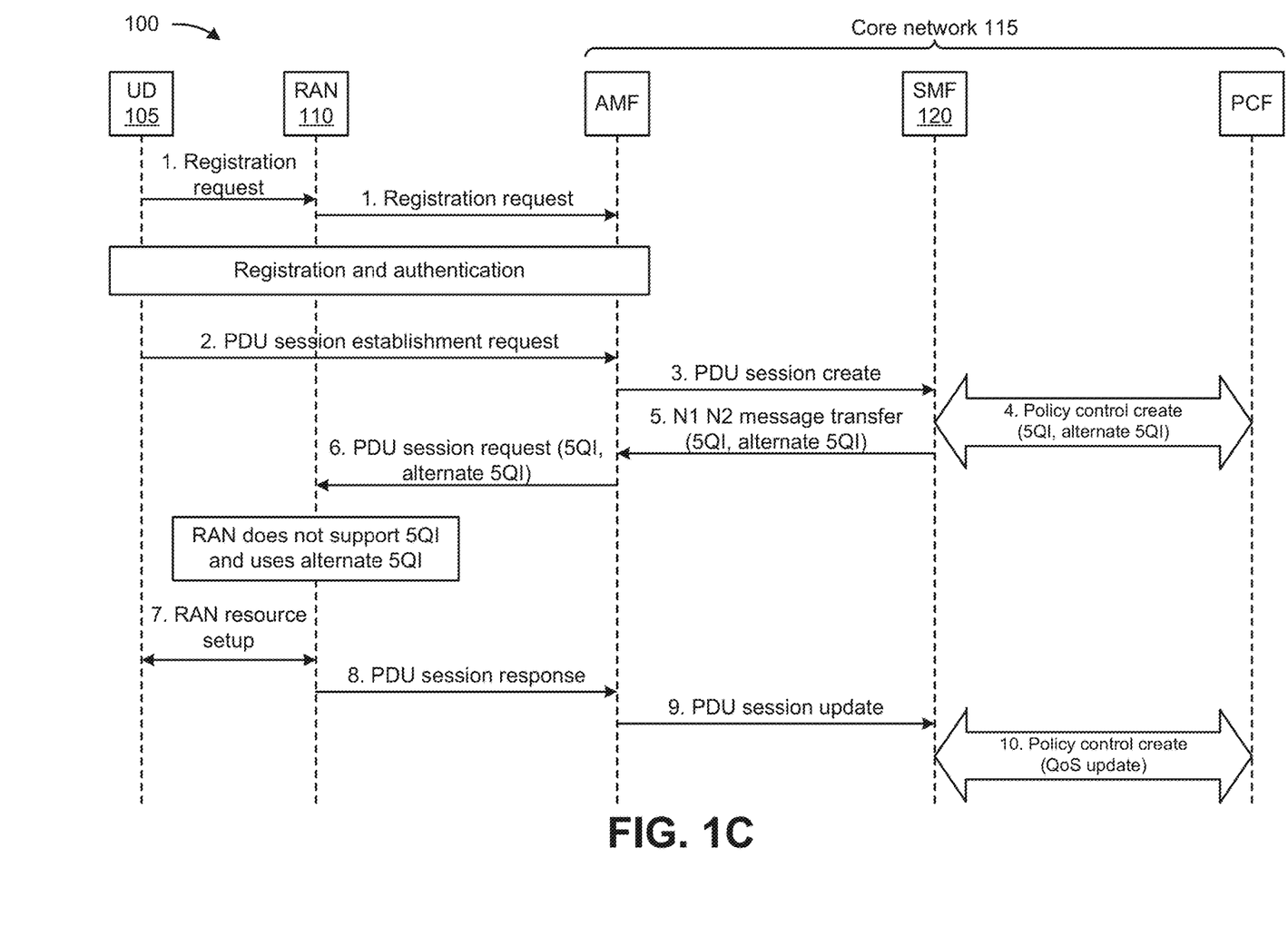

FIG. 1C is a call flow diagram depicting steps associated with a second approach for enabling a PDU session and/or non-GBR flow to be created with an alternate 5QI when a PDU session and/or non-GBR flow creation is being rejected due to the 5QI not being supported in the RAN 110. As shown at step 1 of FIG. 1C, the user device 105 may provide a registration request to the RAN 110 and the RAN 110 may provide the registration request to the AMF. For example, the user device 105 may attempt to establish a PDU session (e.g., a non-GBR flow) with the core network 115, via the RAN 110. In order to establish the PDU session, the user device 105 may generate the registration request that requests establishment of the PDU session with the RAN 110 and the core network 115, as described above in connection with FIG. 1A. The user device 105 may provide the registration request to the RAN 110, and the RAN 110 may forward the registration request to the AMF. The AMF may receive the registration request from the RAN 110. As further shown in FIG. 1C, the AMF may perform registration and authentication of the user device 105, via the RAN 110. For example, the AMF may review the information included in the registration request, and may deny registration and/or authentication of the user device 105, for establishment of the PDU session, based on the information included in the registration request. Alternatively, the AMF may allow registration and/or authentication of the user device 105, for establishment of the PDU session, based on the information included in the registration request.

As shown at step 2 of FIG. 1C, once the user device 105 is registered and authenticated for establishment of the PDU session, the user device 105 may provide a PDU session establishment request to the AMF. The PDU session establishment request may include a request to establish the PDU session with the RAN 110 and the core network 115. As shown in step 3, the AMF and the SMF 120 may communicate to create the PDU session for the user device 105. For example, the AMF may provide a request to create the PDU session, and PDU session management requirements, to the SMF 120, and the SMF 120 may receive the request and the PDU session management requirements. As shown at step 4, the SMF 120 may establish a policy control session with the PCF, and may request policy control information from the PCF, via the policy control session. Based on operator policies, a subscriber profile associated with the user of the user device 105, and other inputs, the PCF may determine that a preferred 5QI value with stringent QoS characteristics is to be used for the PDU session, but that an alternate 5QI value (e.g., with less stringent QoS characteristics than the preferred 5QI value) may be used as well. The PCF may provide the preferred 5QI value and the alternate 5QI value to the SMF 120, and the SMF 120 may receive the preferred 5QI value and the alternate 5QI value.

As shown at step 5 of FIG. 1C, the SMF 120 may transfer a message to the AMF. The message may include the preferred 5QI value, the alternate 5QI value, and/or other policy control information for the PDU session. As shown at step 6, the AMF may generate a PDU session request that includes the preferred 5QI value and the alternate 5QI value, and may provide the PDU session request, with the preferred 5QI value and the alternate 5QI value, to the RAN 110. The RAN 110 may receive the PDU session request, and may determine whether the PDU session can be created based on the preferred 5QI value or the alternate 5QI value. In some implementations, the RAN 110 may determine that the PDU session cannot be created based on the preferred 5QI value since the preferred 5QI value is not supported by the RAN 110. However, the RAN 110 may determine that the PDU session can be created based on the alternate 5QI value since the alternate 5QI value is supported by the RAN 110.

Based on determining that the PDU session can be created based on the alternate 5QI value, the RAN 110 may set up resources of the RAN 110 for the user device 105 to utilize during the PDU session. As shown at step 7 of FIG. 1C, the RAN 110 may allocate the resources of the RAN 110 to the user device 105. The RAN 110 also may generate a PDU session response indicating that the PDU session can be created since the alternate 5QI value is supported by the RAN 110. As shown at step 8, the RAN 110 may provide the PDU session response (e.g., with the indication that the alternate 5QI value is supported by the RAN 110) to the AMF. Based on receiving the PDU session response, the AMF may generate a PDU session update message that includes the indication that the alternate 5QI value is supported by the RAN 110. As shown at step 9, the AMF may provide the PDU session update message to the SMF 120, and the SMF 120 may receive the PDU session update message. As shown at step 10, based on the indication that the alternate 5QI value is supported by the RAN 110 (e.g., included in the PDU session update message), the SMF 120 may update the policy control session with the PCF by providing a QoS update (e.g., indicating that the alternate 5QI value is being utilized for the PDU session) to the PCF, via the policy control session.

Figure 1D:
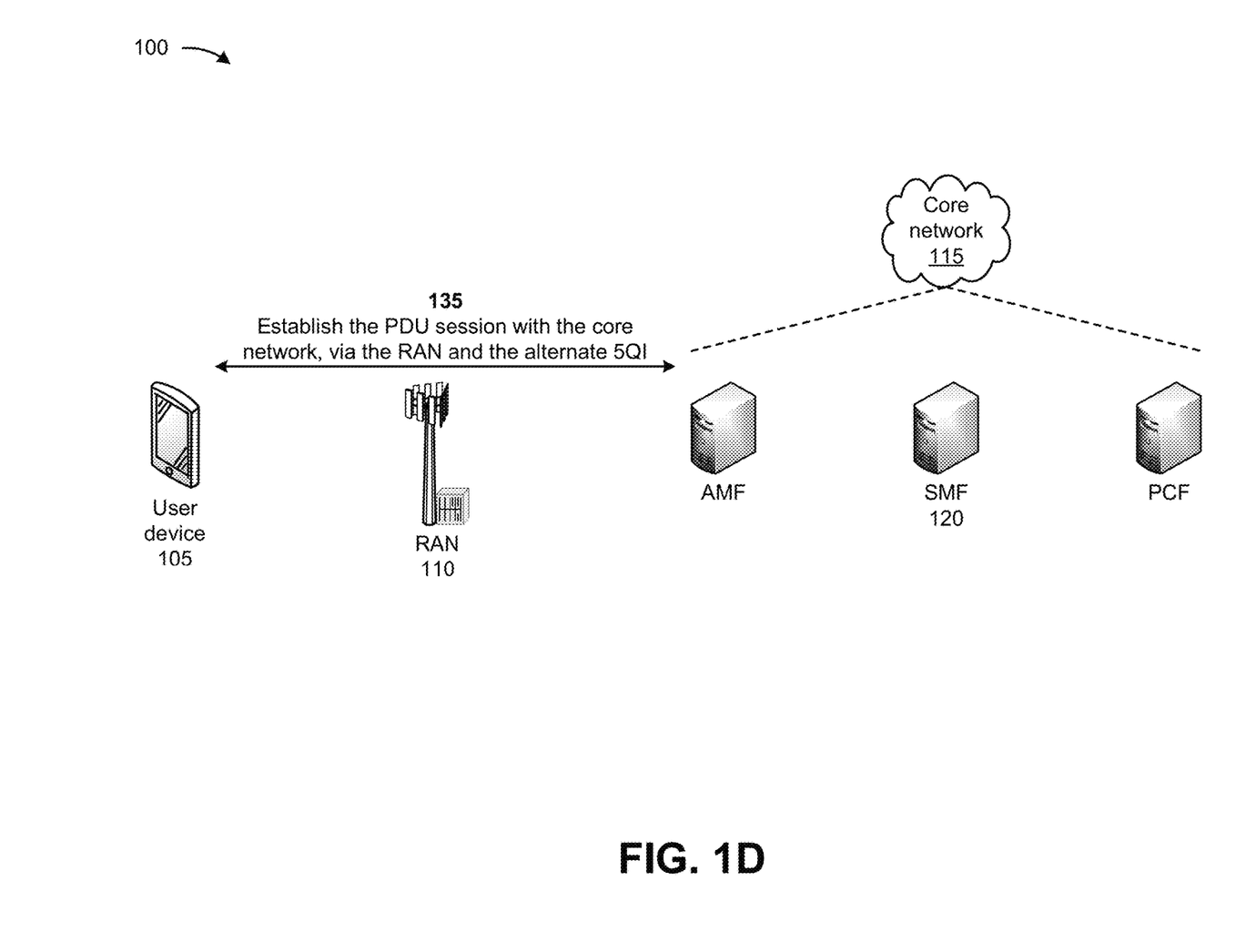

As shown in FIG. 1D, and by reference number 135, the user device 105 may establish the PDU session with the core network 115, via the RAN 110 and the alternate 5QI. For example, once the resources of the RAN 110 are allocated to the user device 105 and the PCF receives the QoS update from the SMF 120, the user device 105 may establish the PDU session with the core network 115, via the RAN 110. The user device 105 may conduct the PDU session until the user device 105 terminates the PDU session.

In this way, the SMF 120 enables an alternate QoS for non-guaranteed bit rate flows. For example, the SMF 120 may utilize two approaches that enable a session and/or non-GBR flow to be created with an alternate 5QI when session and/or non-GBR flow creation is being rejected due to the 5QI not being supported in the RAN 110. In a first approach, the SMF 120 may reattempt session creation when an indication is received from the RAN 110 that the 5QI is not supported. In a second approach, the SMF 120 may provide the alternate 5QI to the RAN 110 so that the RAN 110 may utilize the alternate 5QI when a preferred 5QI is not supported. Thus, the SMF 120 may conserve computing resources, networking resources, and/or other resources that would have otherwise been consumed by failing to establish sessions for 5QI values that are not supported by the RAN 110, reattempting and failing to establish the sessions for the 5QI values that are not supported by the RAN 110, providing a poor user experience for a user of the user device 105, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
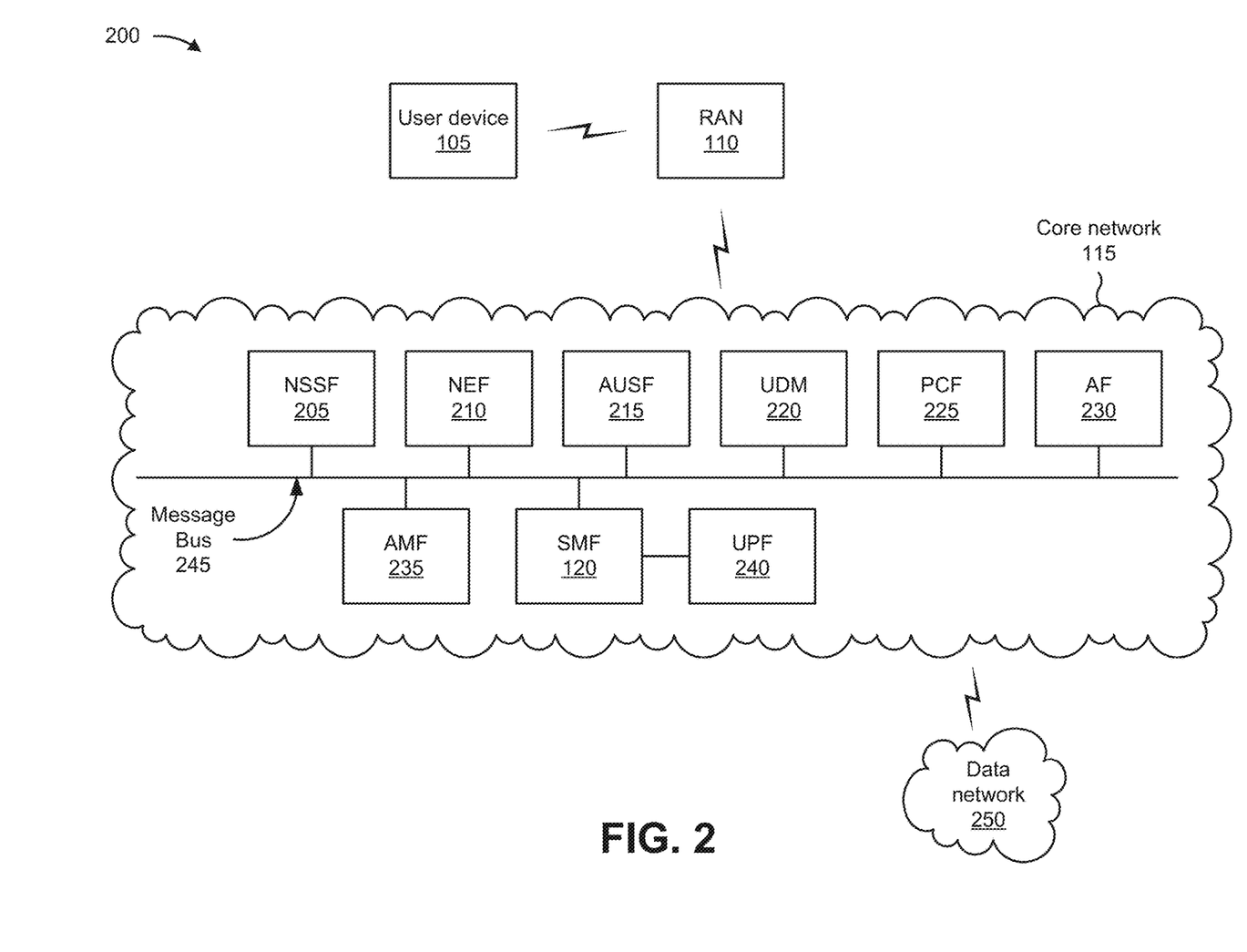
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, and a data network 250. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, a unified data management (UDM) component 220, a PCF 225, an application function (AF) 230, an AMF 235, the SMF 120, and/or a user plane function (UPF) 240. These functional elements may be communicatively connected via a message bus 245. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the user device 105 in the wireless telecommunications system.

The UDM 220 includes one or more devices that store user data and profiles in the wireless telecommunications system. The UDM 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 120 includes one or more devices that support the establishment, modification, and release of communication sessions in the wireless telecommunications system. For example, the SMF 120 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The message bus 245 represents a communication structure for communication among the functional elements. In other words, the message bus 245 may permit communication between two or more functional elements.

The data network 250 includes one or more wired and/or wireless data networks. For example, the data network 250 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
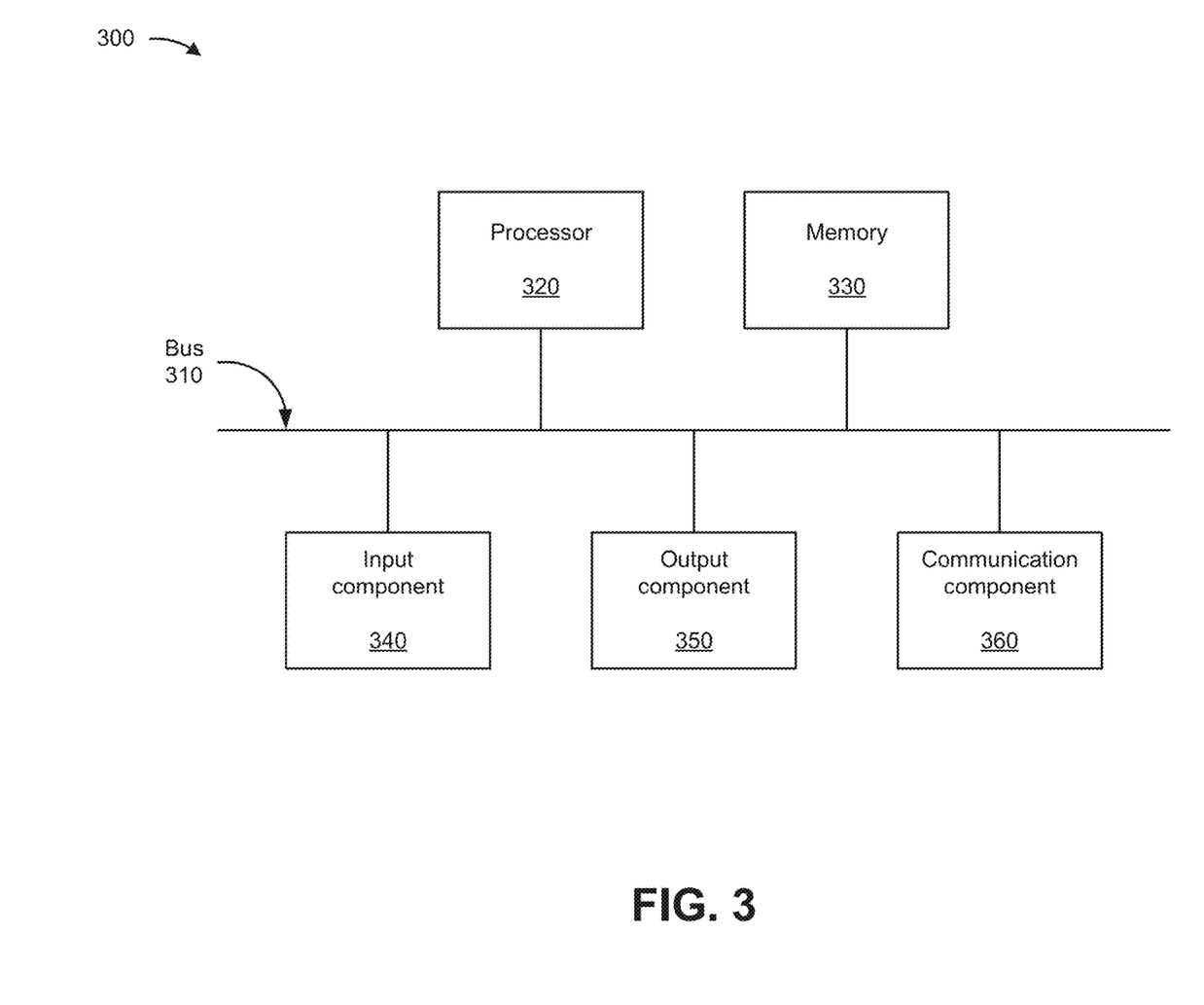
FIG. 3 is a diagram of example components of one or more devices of FIG. 2.

FIG. 3 is a diagram of example components of a device 300, which may correspond to the user device 105, the RAN 110, the SMF 120, the NSSF 205, the NEF 210, the AUSF 215, the UDM 220, the PCF 225, the AF 230, the AMF 235, and/or the UPF 240. In some implementations, the user device 105, the RAN 110, the SMF 120, the NSSF 205, the NEF 210, the AUSF 215, the UDM 220, the PCF 225, the AF 230, the AMF 235, and/or the UPF 240 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
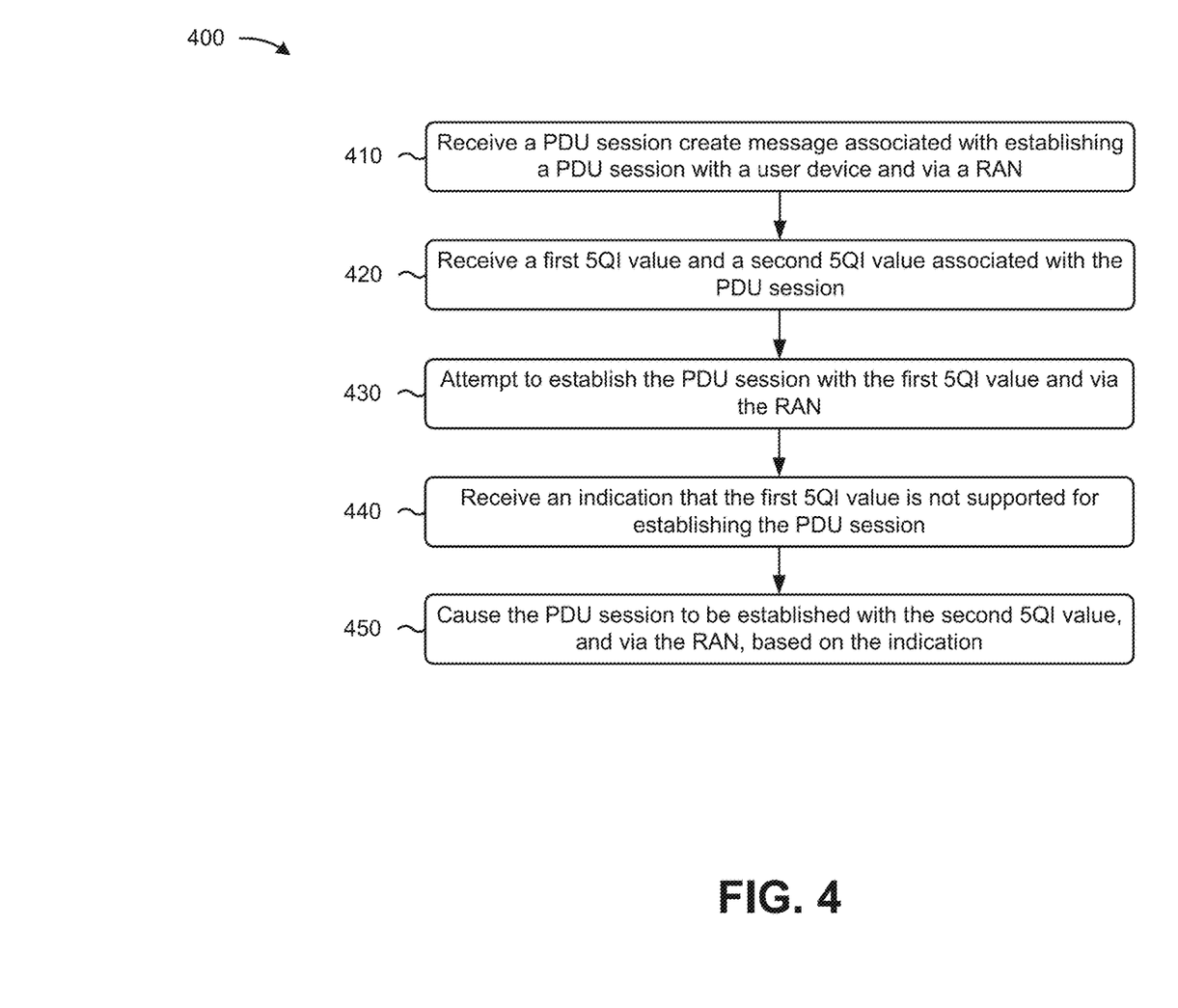
FIG. 4 is a flowchart of an example process for enabling an alternate QoS for non-guaranteed bit rate flows.

FIG. 4 is a flowchart of an example process 400 for enabling an alternate QoS for non-guaranteed bit rate flows. In some implementations, one or more process blocks of FIG. 4 may be performed by a network device (e.g., the SMF 120). In some implementations, one or more process blocks of FIG. 4 may be performed by another device or a group of devices separate from or including the network device, such as a RAN (e.g., the RAN 110), a PCF (e.g., the PCF 225), and/or an AMF (e.g., the AMF 235). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a PDU session create message associated with establishing a PDU session with a user device and via a RAN (block 410). For example, the network device may receive a PDU session create message associated with establishing a PDU session with a user device and via a RAN, as described above. In some implementations, the PDU session is a non-guaranteed bit rate flow session.

As further shown in FIG. 4, process 400 may include receiving a first 5QI value and a second 5QI value associated with the PDU session (block 420). For example, the network device may receive a first 5QI value and a second 5QI value associated with the PDU session, as described above. In some implementations, the first 5QI value is associated with a first QoS and the second 5QI value is associated with a second QoS, and the first QoS is greater than the second QoS. In some implementations, the first 5QI value is a preferred 5QI value and the second 5QI value is an alternate 5QI value.

In some implementations, receiving the first 5QI value and the second 5QI value associated with the PDU session includes establishing a policy control session with a PCF, and receiving, from the PCF, the first 5QI value and the second 5QI value via the policy control session. In some implementations, QoS characteristics associated with the first 5QI value are more stringent than QoS characteristics associated with the second 5QI value.

As further shown in FIG. 4, process 400 may include attempting to establish the PDU session with the first 5QI value and via the RAN (block 430). For example, the network device may attempt to establish the PDU session with the first 5QI value and via the RAN, as described above. In some implementations, attempting to establish the PDU session with the first 5QI value and via the RAN includes causing a PDU session request message, with the first 5QI value, to be provided to the RAN.

As further shown in FIG. 4, process 400 may include receiving an indication that the first 5QI value is not supported for establishing the PDU session (block 440). For example, the network device may receive an indication that the first 5QI value is not supported for establishing the PDU session, as described above. In some implementations, receiving the indication that the first 5QI value is not supported for establishing the PDU session includes receiving a PDU session update message indicating that the first 5QI value is not supported for establishing the PDU session.

As further shown in FIG. 4, process 400 may include causing the PDU session to be established with the second 5QI value, and via the RAN, based on the indication (block 450). For example, the network device may cause the PDU session to be established with the second 5QI value, and via the RAN, based on the indication that the first 5QI value is not supported for establishing the PDU session, as described above.

In some implementations, process 400 includes establishing a policy control session with a PCF, and providing, to the PCF and via the policy control session, a QoS update for the PDU session. In some implementations, process 400 includes receiving another PDU session create message associated with establishing another PDU session with the user device and via the RAN, and providing the second 5QI value to the RAN, wherein the RAN is configured to establish the other PDU session based on the second 5QI value. In some implementations, providing the second 5QI value to the RAN includes providing, to the RAN and via an AMF, a PDU session request that includes the second 5QI value. In some implementations, process 400 includes updating the policy control session with the PCF by providing, to the PCF, another QoS update for the other PDU session.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
receiving, by a network device, a protocol data unit (PDU) session create message associated with establishing a PDU session with a user device and via a radio access network (RAN);
receiving, by the network device, a first fifth-generation quality of service identifier (5QI) value and a second 5QI value associated with the PDU session;
attempting, by the network device, to establish the PDU session with the first 5QI value and via the RAN;
receiving, by the network device, an indication that the first 5QI value is not supported for establishing the PDU session; and
causing, by the network device, the PDU session to be established with the second 5QI value, and via the RAN, based on the indication that the first 5QI value is not supported for establishing the PDU session.
2. The method of claim 1, wherein the first 5QI value is associated with a first quality of service and the second 5QI value is associated with a second quality of service, and wherein the first quality of service is greater than the second quality of service.

3. The method of claim 1, wherein the first 5QI value is a preferred 5QI value and the second 5QI value is an alternate 5QI value.

4. The method of claim 1, wherein receiving the first 5QI value and the second 5QI value associated with the PDU session comprises:
establishing a policy control session with a policy control function; and
receiving, from the policy control function, the first 5QI value and the second 5QI value via the policy control session.

5. The method of claim 1, wherein attempting to establish the PDU session with the first 5QI value and via the RAN comprises:
causing a PDU session request message, with the first 5QI value, to be provided to the RAN.

6. The method of claim 1, wherein receiving the indication that the first 5QI value is not supported for establishing the PDU session comprises:
receiving a PDU session update message indicating that the first 5QI value is not supported for establishing the PDU session.

7. The method of claim 1, further comprising:
establishing a policy control session with a policy control function; and
providing, to the policy control function and via the policy control session, a quality of service update for the PDU session.

8. A network device, comprising:
one or more processors configured to:
establish a policy control session with a policy control function;
receive a protocol data unit (PDU) session create message associated with establishing a PDU session with a user device and via a radio access network (RAN);
receive a first fifth-generation quality of service identifier (5QI) value and a second 5QI value associated with the PDU session;
attempt to establish the PDU session with the first 5QI value and via the RAN;
receive an indication that the first 5QI value is not supported for establishing the PDU session;
cause the PDU session to be established with the second 5QI value, and via the RAN, based on the indication that the first 5QI value is not supported for establishing the PDU session; and
provide, to the policy control function and via the policy control session, a quality of service update for the PDU session.

9. The network device of claim 8, wherein the one or more processors are further configured to:
receive another PDU session create message associated with establishing another PDU session with the user device and via the RAN; and
provide the second 5QI value to the RAN,
wherein the RAN is configured to establish the other PDU session based on the second 5QI value.

10. The network device of claim 9, wherein the one or more processors are further configured to:
update policy control session with the policy control function by providing, to the policy control function, another quality of service update for the other PDU session.

11. The network device of claim 9, wherein the one or more processors, to provide the second 5QI value to the RAN, are configured to:
provide, to the RAN and via an access and mobility management function, a PDU session request that includes the second 5QI value.

12. The network device of claim 8, wherein quality of service characteristics associated with the first 5QI value are more stringent than quality of service characteristics associated with the second 5QI value.

13. The network device of claim 8, wherein the network device is a session management function.

14. The network device of claim 8, wherein the PDU session is a non-guaranteed bit rate flow session.

15. A non-transitory computer-readable medium storing a set of instructions, the set of instructions comprising:
one or more instructions that, when executed by one or more processors of a network device, cause the network device to:
receive a protocol data unit (PDU) session create message associated with establishing a PDU session with a user device and via a radio access network (RAN);
receive a first fifth-generation quality of service identifier (5QI) value and a second 5QI value associated with the PDU session,
wherein quality of service characteristics associated with the first 5QI value are more stringent than quality of service characteristics associated with the second 5QI value;
attempt to establish the PDU session with the first 5QI value and via the RAN;
receive an indication that the first 5QI value is not supported for establishing the PDU session; and
cause the PDU session to be established with the second 5QI value, and via the RAN, based on the indication that the first 5QI value is not supported for establishing the PDU session.

16. The non-transitory computer-readable medium of claim 15, wherein the one or more instructions, that cause the network device to receive the first 5QI value and the second 5QI value associated with the PDU session, cause the network device to:
establish a policy control session with a policy control function; and
receive, from the policy control function, the first 5QI value and the second 5QI value via the policy control session.

17. The non-transitory computer-readable medium of claim 15, wherein the one or more instructions, that cause the network device to attempt to establish the PDU session with the first 5QI value and via the RAN, cause the network device to:
cause a PDU session request message, with the first 5QI value, to be provided to the RAN.

18. The non-transitory computer-readable medium of claim 15, wherein the one or more instructions, that cause the network device to receive the indication that the first 5QI value is not supported for establishing the PDU session, cause the network device to:
receive a PDU session update message indicating that the first 5QI value is not supported for establishing the PDU session.

19. The non-transitory computer-readable medium of claim 15, wherein the one or more instructions further cause the network device to:
establish a policy control session with a policy control function; and provide, to the policy control function and via the policy control session, a quality of service update for the PDU session.

20. The non-transitory computer-readable medium of claim 15, wherein the one or more instructions further cause the network device to:
receive another PDU session create message associated with establishing another PDU session with the user device and via the RAN; and
provide the second 5QI value to the RAN,
wherein the one or more instructions further cause the network device to establish the other PDU session based on the second 5QI value.

\* \* \* \* \*